(12) United States Patent
Dutton et al.

(10) Patent No.: US 7,204,676 B2
(45) Date of Patent: Apr. 17, 2007

(54) FAN BLADE CURVATURE DISTRIBUTION FOR HIGH CORE PRESSURE RATIO FAN

(75) Inventors: Ronald James Dutton, Guelph (CA); Kimberley Ann MacDonald, Milton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 210 days.

(21) Appl. No.: 10/845,117

(22) Filed: May 14, 2004

(65) Prior Publication Data

US 2005/0254956 A1    Nov. 17, 2005

(51) Int. Cl.
*F01D 5/14*    (2006.01)
(52) U.S. Cl. ................................ 416/238; 416/242
(58) Field of Classification Search ............ 416/223 R, 416/238, 242, 243, DIG. 5
See application file for complete search history.

(56) References Cited

U.S. PATENT DOCUMENTS

| | | | |
|---|---|---|---|
| 4,726,737 A | 2/1988 | Weingold et al. ........ 416/223 A |
| 4,737,077 A | 4/1988 | Vera ........................... 416/242 |
| 5,044,885 A | 9/1991 | Odoul et al. | |
| 5,167,489 A | 12/1992 | Wadia et al. ............. 415/182.1 |
| 5,273,400 A | 12/1993 | Amr ........................... 416/189 |
| 5,624,234 A | 4/1997 | Neely et al. ................ 416/238 |
| 5,642,985 A | 7/1997 | Spear et al. ................ 416/238 |
| 6,059,532 A | 5/2000 | Chen et al. ............. 416/223 A |
| 6,071,077 A * | 6/2000 | Rowlands ............... 416/223 A |
| D439,324 S | 3/2001 | Wood ........................ D23/413 |
| 6,241,474 B1 | 6/2001 | Alizadeh et al. ........... 416/189 |
| 6,299,412 B1 * | 10/2001 | Wood et al. ............. 416/223 A |
| 6,328,533 B1 | 12/2001 | Decker et al. .............. 416/228 |
| 6,331,100 B1 | 12/2001 | Liu et al. | |
| 6,428,281 B1 * | 8/2002 | Botrel et al. ................ 416/243 |
| RE38,040 E | 3/2003 | Spear et al. ................ 415/181 |

* cited by examiner

*Primary Examiner*—Edward K. Look
*Assistant Examiner*—Devin Hanan
(74) *Attorney, Agent, or Firm*—Ogilvy Renault LLP

(57) ABSTRACT

A method for reducing vortex promotion of a rotor blade used in high core PR fans comprises shifting a curvature distribution of a blade section immediately adjacent to the hub such that a major turning of the suction side of the section is located near a trailing edge of the blade.

10 Claims, 3 Drawing Sheets

FAN BLADE CURVATURE DISTRIBUTION FOR HIGH CORE PRESSURE RATIO FAN

FIELD OF THE INVENTION

The present invention relates to an aircraft gas turbine engine, and more particularly to a rotor blade of an aircraft gas turbine engine, with an enhanced profile.

BACKGROUND OF THE INVENTION

A boost-less gas turbine engine does not include a boost compressor stage and therefore typically includes a high core pressure ratio (PR) fan which is adapted to compensate for the missing boost stage.

Conventional high core PR fan blades are usually configured with extreme blade turning immediately above the fan hub, which creates a very acute local angle between the blade suction side and the fan hub towards the blade trailing edge. Such an acute angle can help create and/or worsen a corner vortex at the trailing edge of the blade, potentially adversely affecting the quality of airflow at the hub area feeding into downstream blade rows of the compressor, and thereby reducing the overall engine efficiency and stability. Efforts have been made to solve this problem. For example U.S. Pat. No. 6,331,100 teaches providing an S-bowed stacking axis along which centers of gravity of the sections of the blade are aligned, in order to permit the trailing edge to be oriented substantially normal to the root of the bowed suction side and to lean hindward thereabove. U.S. Pat. No. 6,299,412 teaches that the airfoil suction side is laterally or tangentially bowed along the trailing edge near or adjacent the root at the intersection with the disk perimeter in order to increase blade efficiency and improve stall margin.

Nevertheless, there is still a need for improved approaches and solutions to better solve the corner vortex problem.

SUMMARY OF THE INVENTION

One object of the present invention is to provide a fan blade of an aircraft gas turbine engine, with an enhanced profile.

In accordance with one aspect of the present invention, there is a method provided for reducing vortex promotion of a rotor blade used in a high core pressure ratio fans. The blade has a plurality of sections extending from a hub to a tip thereof. The method comprises providing a curvature distribution to a first blade section immediately adjacent to the hub such that a major turning of a suction side of the respective sections is located near a trailing edge of the blade, thereby increasing an angle of the section at a suction side between the trailing edge and a periphery of the hub.

A predetermined total curvature turning of the suction side of each section of the rotor blade is preferably predetermined and is unchanged in the step of providing the curvature distribution.

In accordance with another aspect of the present invention, there is a rotor blade of a gas turbine engine affixed to a hub, which comprises a plurality of sections extending from the hub to a tip of the blade, defining leading and trailing edges extending between the hub and tip thereof, and pressure and suction sides joining at the respective leading and trailing edges. The respective sections define different curvature distributions at the suction side thereof to create a major turning of the suction side of a first blade section immediately adjacent to the hub. The major turning of the suction side is located near the trailing edge relative to the remaining sections.

In accordance with a further aspect of the present invention, there is a high core pressure ratio fan of a gas turbine engine which comprises a rotor having a hub, and a plurality of blades extending from the hub. Each blade defines leading and trailing edges extending from the hub to a tip thereof, and pressure and suction sides extending between the hub and the tip and adjoining at the respective leading and trailing edges. Each blade includes a plurality of sections thereof with different curvature distributions at the suction side, thereby forming a curved surface of the suction side of the blade having a pocket located in an area of the suction side immediately adjacent to the hub in a vicinity of the trailing edge relative to the remaining area of the suction side, thereby causing the trailing edge to have a turning portion immediately adjacent to the hub adapted to increase an angle of the trailing edge at the suction side relative to a periphery of the hub.

The present invention advantageously achieves the required high core PR profile of a high core pressure ratio fan while minimizing the promotion of a corner vortex, thereby improving the airfoil flow quality of the fan, and thus improving an overall efficiency and stability of the engine performance.

Other features and advantages of the present invention will be better understood with reference to a preferred embodiment described hereinafter.

BRIEF DESCRIPTION OF THE DRAWINGS

Reference will now be made to the accompanying drawings, showing by way of illustration the preferred embodiment thereof, in which.

DETAILED DESCRIPTION OF THE PREFERRED EMBODIMENT

Figure 1:
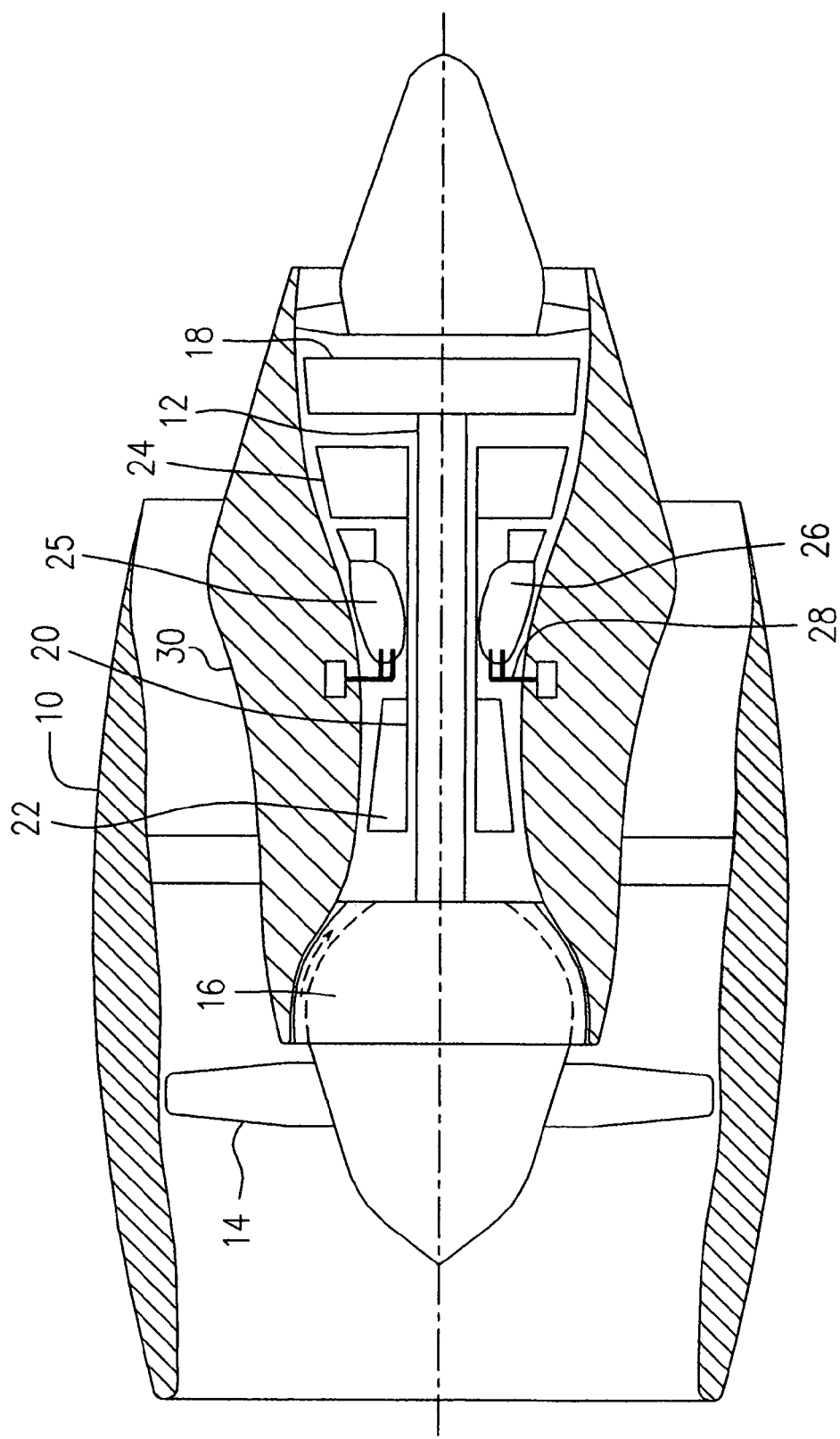
FIG. 1 is a schematic cross-sectional view of a turbofan gas turbine engine for use in aircraft, illustrating one application of the present invention.

A turbofan gas turbine engine illustrated schematically in FIG. 1 incorporates an embodiment of the present invention, presented as an example of the application of the present invention, and includes a housing or nacelle 10, a low pressure spool assembly seen generally at 12 which includes a high core pressure ratio fan 14, low pressure compressor 16 and low pressure turbine 18, and a high pressure spool assembly seen generally at 20 which includes a high pressure compressor 22 and a high pressure turbine 24. There is provided a burner seen generally at 25 which includes an annular combustor 26 and a plurality of fuel injectors 28 for mixing liquid fuel with air and injecting the mixed fuel/air flow into the annular combustor to be ignited for generating combustion gases. The high core pressure ratio fan 14 can also be used in other types of turbofan gas turbine engines, for example, a boost-less gas turbine engine which does not include the low pressure compressor 16.

Figure 2:
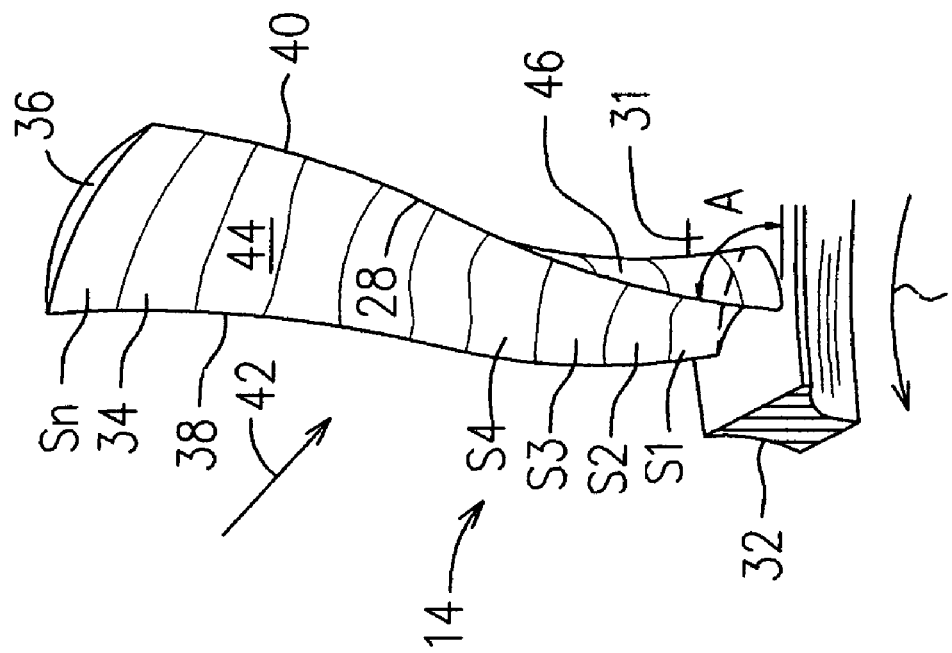
FIG. 2 is partial perspective view of the high core PR fan used in the turbofan gas turbine engine, incorporating one embodiment of the present invention.

In FIG. 2, a portion of the high core pressure ratio fan 14 is illustrated and includes an annular hub 32 and a plurality of circumferentially spaced apart rotor blades or airfoils 34 extending radially outwardly from a periphery 31 of the annular hub 32. The rotor blade 34 includes a leading edge 38 and a trailing edge 40, with respect to the airflow direction as indicated by arrow 42 passing through and being compressed by the rotor blades 34. The leading and trailing edges 38, 40 extend from the periphery 31 of the hub 32 to a tip 36 of the rotor blade 34. The rotor blade 34 further includes a concave pressure side 44 and a convex suction side 46, joining together at the respective leading and trailing edges 38, 40. The rotor blade 34 rotates in a rotational direction as illustrated by arrow 48. The pressure side 44 and the suction side 46 are aerodynamically configured for maximizing the efficiency of air compression and achieve desired pressure ratio. For design purposes, the rotor blade 34 is divided into a number of sections S1, S2, S3, S4 to Sn stacked finite radially and outwardly from the hub 32 to the tip 36 of the rotor blade 34. It will all be understood that the sections, as illustrated in FIGS. 2 and 5 are enlarged for the purposes of description only.

Figure 6:
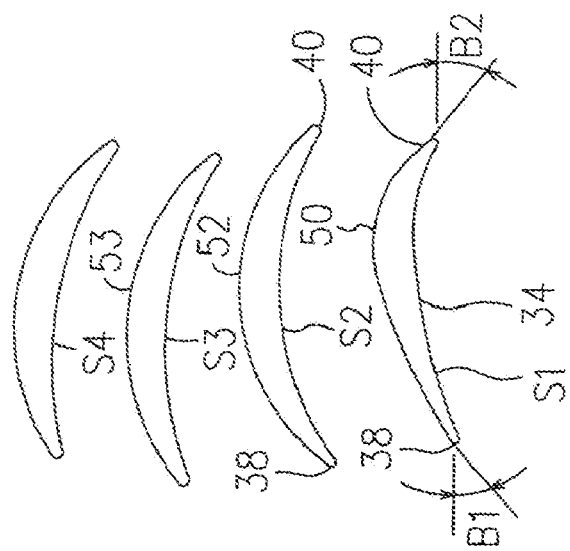
FIG. 6 illustrates in respective axial planes, profiles of the first four sections of the fan blade of FIG. 5.
Figure 5:
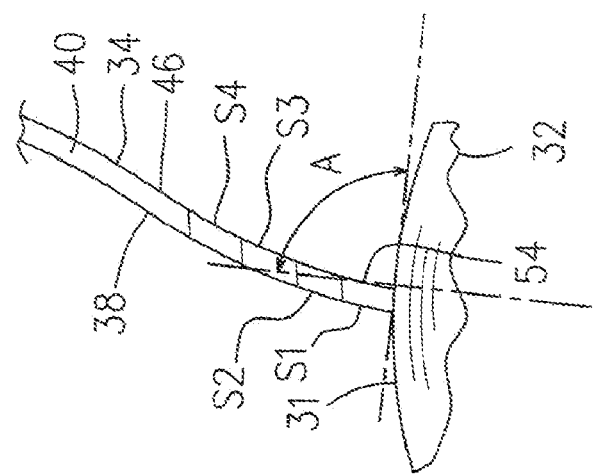
FIG. 5 is a partial edge-on view of the trailing edge of a fan blade having a shifted curvature distribution in a radial plane according to the embodiment of FIG. 2.

Referring to FIGS. 2 and 5–6, the rotor blade 34 of the high core pressure ratio fan 14 includes a high blade turning in a radial plane, in the sections immediately above the fan hub 32, as illustrated by sections S1, S2 and S3 in FIG. 2, and also defines a trailing edge angle A at the suction side 46 with respect to the periphery 31 of the hub 32, which would have been much more acute than is illustrated in FIGS. 2 and 5 if the blade was conventionally designed. This will be further discussed with reference to FIGS. 3 and 4.

Figure 3:
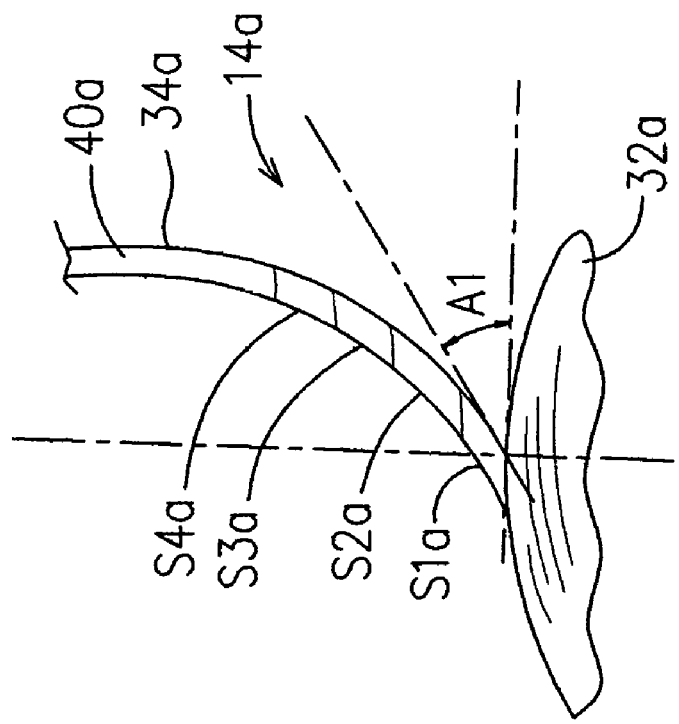
FIG. 3 is a partial edge-on view of the trailing edge of a conventional fan blade with the remainder thereof being omitted in the interests of clarity, showing the trailing edge of a conventional fan blade having a nominal curvature distribution in a radial plane.
Figure 4:
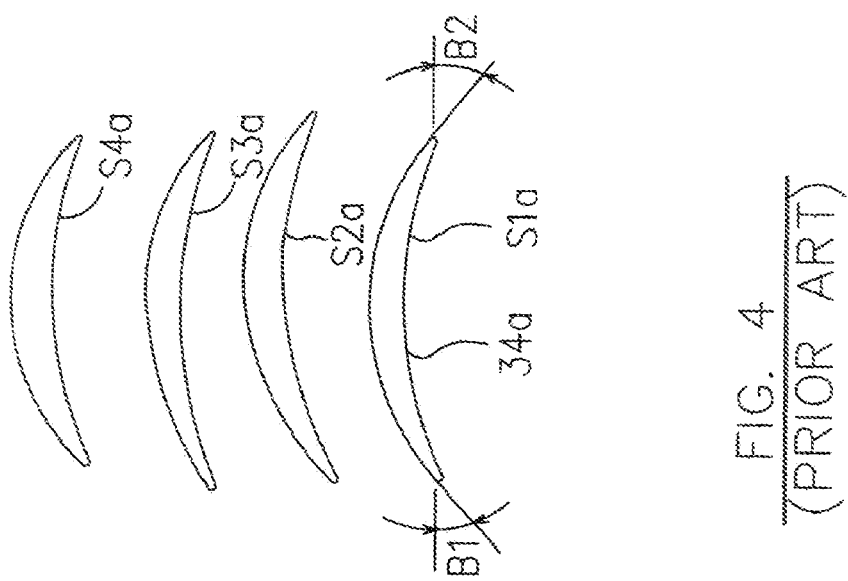
FIG. 4 illustrates in respective axial planes, the profiles of a number of sections of the conventional fan blade of FIG. 3.

FIG. 3 illustrates a prior art high core pressure ratios rotor blade 34a and an annular hub 32a of a conventional high core pressure ratio fan 14a, and having a trailing edge 40a with angle A1. The profiles of sections S1a, S2a, S3a and S4a are illustrated in FIG. 4 in which B1 indicates an angle of the suction side of the rotor blade 34a at the leading edge with respect to a plane parallel to the longitudinal axis. Similarly, B2 indicates an angle of the suction side of the rotor blade 34a at the trailing edge 40a with respect to a plane parallel to the longitudinal axis. Different sections S1–S4, etc. of the conventional rotor blade 34a have different angles B1 and B2. A total blade turning of the suction side curvature of each section of rotor blade 34a is determined by angles B1 and B2.

Again referring to FIGS. 2, 5 and 6, in accordance with the present invention the curvature distribution in an axial plane, of the individual section of the rotor blade 34 immediately adjacent to the annular hub 32 (for example section S1), is provided with a major turning portion 50 of the suction side curvature near the trailing edge 40. This section is referred to as a "back-loaded section". Sections adjacent this "back loaded" section (for example, S2) are preferably "front loaded", relative to S1 such that the turning 52 of S2 is nearer the leading edge. This front-loading (relative to S1) can be applied to 52, 53, etc. as required, along with changes for the back-loading to S1 to "open up" angle A, i.e. to make angle A as large as possible until it is sufficient to alleviate the corner vortex formation for the given fan blade being designed.

The fan blade 34 is preferably configured with sections each defining a major turning portion of the suction side curvature thereof in an axial plane. These major turning portions defined by the respective sections of the rotor blade 34 are preferably positioned in a sequence gradually approaching the leading edge 38 and the tip 36 of the rotor blade 34. Thus, the suction side 46 of the rotor blade 34 forms a pocket 54 located in an area immediately adjacent to the hub 32 in a vicinity of the trailing edge 40 relative to the remaining area of the pressure side 44, thereby causing the trailing edge 40 to have a turning portion immediately adjacent to the hub 32 in order to increase the angle A of the trailing edge 40 at the suction side 46 relative to the periphery 31 of the hub 32.

In a comparison of FIG. 5 with FIG. 3, it is apparent that the trailing edge 40 of the rotor blade 34 represents a curved line having a tendency to increase the angle A (relative to A1 of FIG. 3) of the section S1 at the suction side 46 between the trailing edge 40 and the periphery 31 of the hub 32. A portion of the trailing edge 40 of the rotor blade 34 immediately adjacent to the hub 32 and extending therefrom preferably tends toward a normal intersection with the hub 32. In contrast, however, the trailing edge 40a of the prior art rotor blade 34a shown in FIG. 3, has a portion thereof immediately adjacent to the hub 32a and extending therefrom at a relatively acute angle, as indicated by A1. Although a substantially normal intersection is shown in FIG. 5, according to the present invention any increase in angle A, such that A>A1, offers improvement over the prior art.

It should be noted that shifting the curvature distribution of the suction side of individual sections of the rotor blade 34 should not change a total curvature turning of the suction side 46 of the rotor blade 34. The total curvature turning is nominal or predetermined in order to achieve a required high core pressure ratio of the fan 14. For example, the rotor blade 34 is designed to achieve the substantially same high core pressure ratio which the conventional rotor blade 34a of FIGS. 3–4 is configured to achieve. Thus, the total curvature turning of the suction side of the individual sections such as S1, S2, etc. should be substantially equal to the total curvature turning of the respective sections of conventional rotor blade 34a, such as S1a, S2a, etc. This condition can be assured when the angle B1 and B2 of the individual sections (only shown with section S1) at leading and trailing edges 38, 40 of the rotor blade 34, are substantially equal to the angles B1, B2 of the corresponding individual sections (only shown with section S1a) at the leading and trailing edges of the prior art rotor blade 34a of FIG. 4.

It should also be noted that the drawings are schematical and are exaggerated to more clearly illustrate the present invention but are not intended to illustrate a proportional physical structure of the embodiment of the present invention.

Modifications and improvements to the above-described embodiment of the present invention may become apparent to those skilled in the art. For example, the present invention may be employed with removably bladed fan rotors or integrally-bladed rotors, and with blades of any profile or sweep angle. The foregoing description is intended to be exemplary rather than limiting. The scope of the present invention is therefore intended to be limited solely by the scope of the appended claims.

We claim:

1. A method for reducing vortex promotion of a rotor blade used in high core pressure ratio fans, the blade having a plurality of sections extending from a hub to a tip thereof, comprising:

providing a different curvature distribution to a first blade section immediately adjacent to the hub such that a major turning of a suction side of the section is located near a trailing edge of the blade, thereby increasing an angle of the section at a suction side between the trailing edge and a periphery of the hub.

2. A method as claimed in claim 1, further comprising providing a curvature distribution to a next blade section immediately adjacent said first section such that a major turning of a suction side of said next blade section is located near a leading edge of the blade relative to said first section.

3. A method as claimed in claim 1 wherein a predetermined total curvature turning of the suction side of each section is predetermined and is unchanged in the step of providing the curvature distribution.

4. A rotor blade of a gas turbine engine affixed to a hub, comprising:
   a plurality of sections extending from the hub to a tip of the blade, defining leading and trailing edges extending between the hub and the tip thereof, and pressure and suction sides joining at the respective leading and trailing edges; and
   the respective sections defining different curvature distributions at the suction side thereof to create a major turning of the suction side of a first blade section immediately adjacent to the hub, the major turning of the suction side being located near the trailing edge relative to the remaining sections.

5. A rotor blade as claimed in claim 4 further comprising a major turning of the suction side of a next blade section immediately adjacent said first blade section such that the major turning of the suction side of said next blade section is located near the leading edge of the blade relative to said first section.

6. A rotor blade as claimed in claim 4 wherein the trailing edge presents in an edge-on view thereof a curved line having a tendency to increase an angle of a section immediately adjacent to the hub at the suction side between the trailing edge thereof and a periphery of the hub.

7. A rotor blade as claimed in claim 4 wherein the trailing edge of a section immediately adjacent to the hub extends substantially radially and outwardly from the hub.

8. A rotor blade as claimed in claim 4 wherein the sections each define a major turning of the suction side thereof, each of the major turnings defined by the respective sections being positioned in a sequence gradually approaching the leading edge and the tip of the blade.

9. A high core pressure ratio fan of a gas turbine engine, comprising:
   a rotor having a hub;
   a plurality of blades extending from the hub, each blade defining leading and trailing edges extending from the hub to a tip thereof, and pressure and suction sides extending between the hub and the tip and joining at the respective leading and trailing edges;
   each blade including a plurality of sections thereof with different curvature distributions at the suction side, thereby forming a curved surface of the suction side of the blade having a pocket located in an area of the suction side immediately adjacent to the hub in a vicinity of the trailing edge relative to the remaining area of the suction side, thereby causing the trailing edge to have a turning portion immediately adjacent to the hub adapted to increase an angle of the trailing edge at the suction side relative to a periphery of the hub.

10. A high core pressure ratio fan as claimed in claim 9 wherein a section of the trailing edge of each blade immediately adjacent to the hub extending therefrom is substantially normal with respect to the periphery of the hub.

* * * * *